United States Patent Office 3,535,067
Patented Oct. 20, 1970

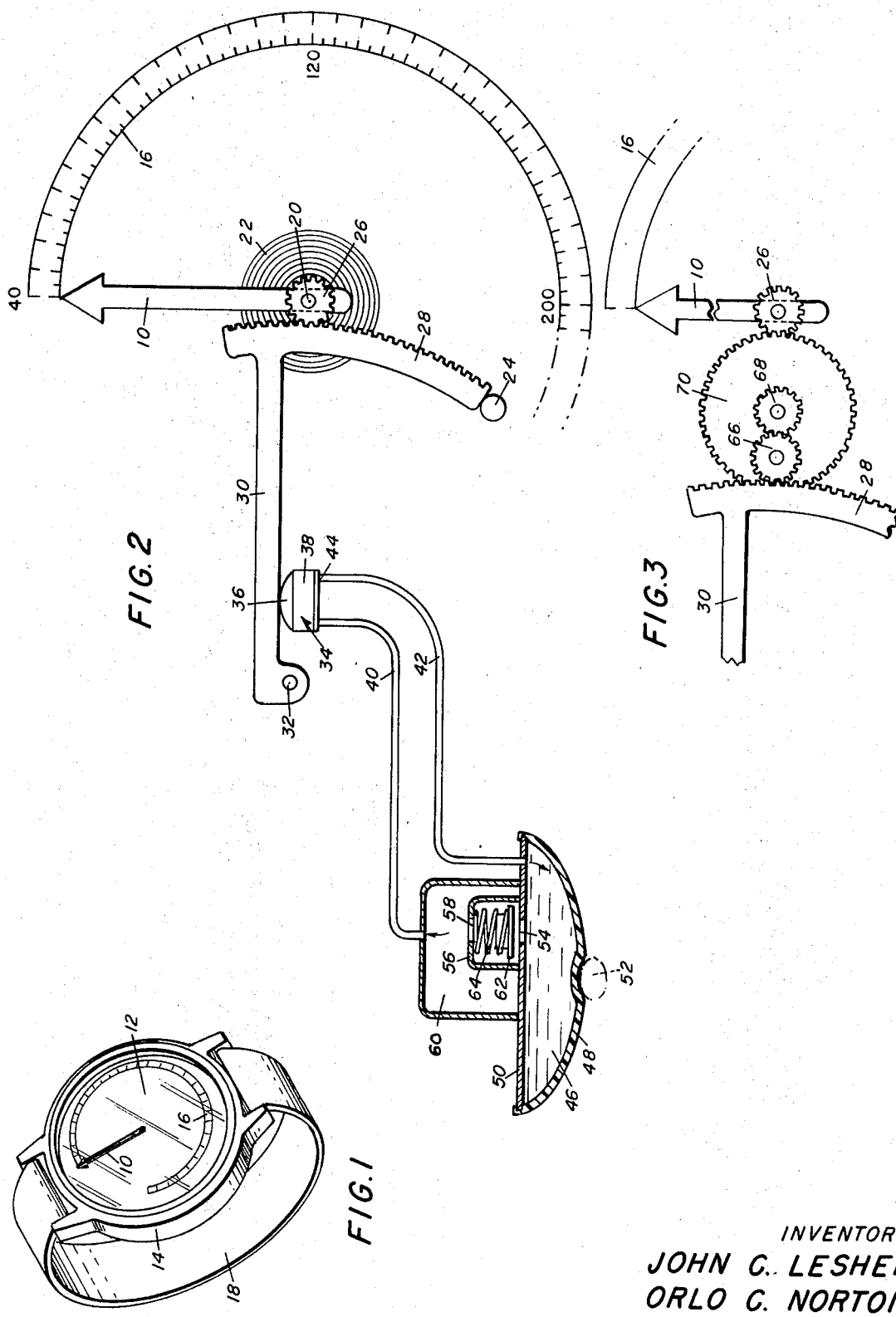

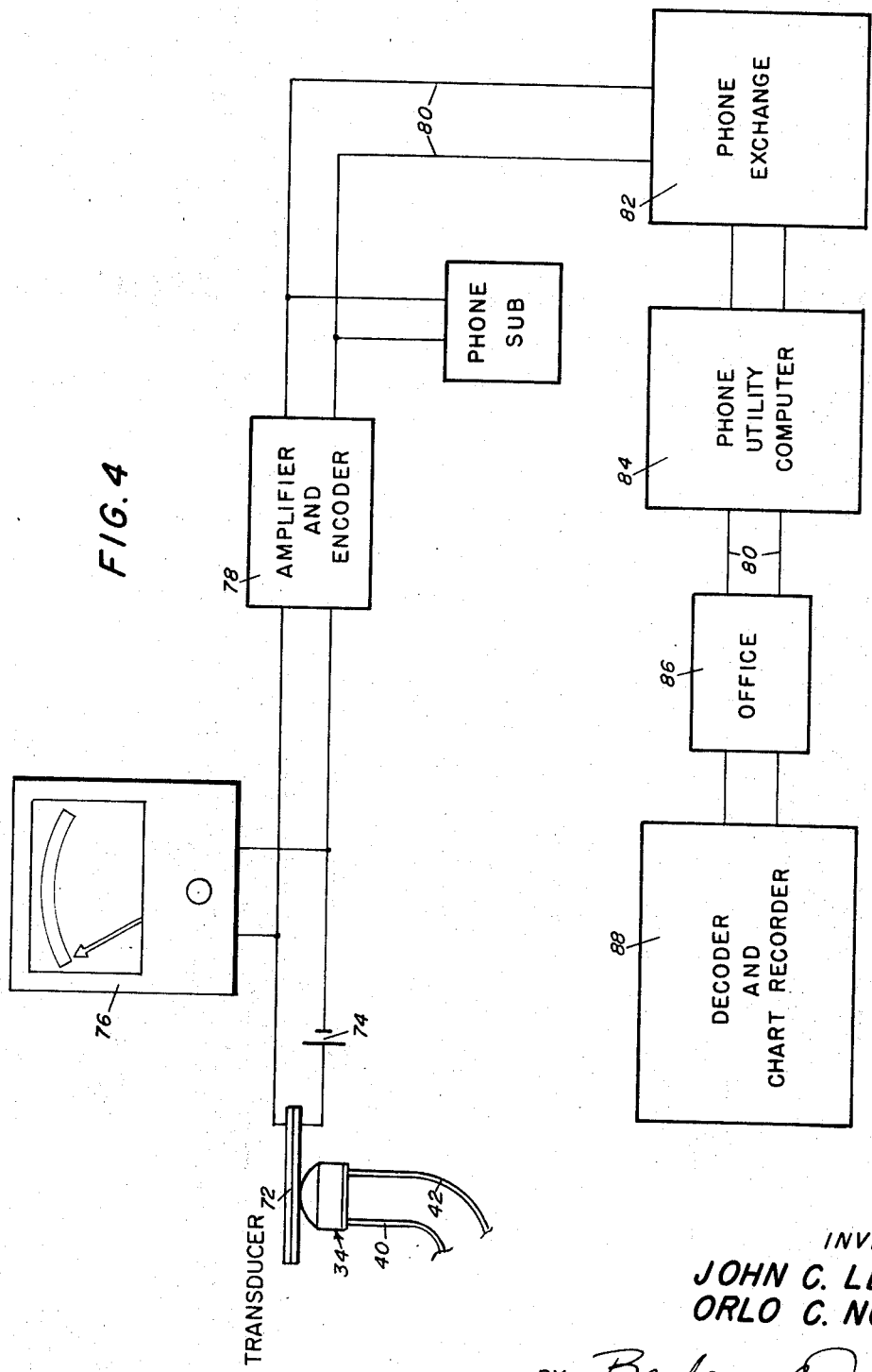

3,535,067
BLOOD PRESSURE AND PULSE INDICATOR
John C. Lesher and Orlo C. Norton, Erie, Pa., assignors to Electro-O-Mech, Inc., Erie, Pa., a corporation of Pennsylvania
Filed Mar. 7, 1967, Ser. No. 621,286
Int. Cl. A61b 5/02
U.S. Cl. 128—2.05                    15 Claims

ABSTRACT OF THE DISCLOSURE

An indicator for continuous monitoring of blood pressure and pulse rate is disclosed, the device being continuously worn by a patient and responsive to circulatory system pulsations. A hydraulic transducer includes a reservoir of fluid, the reservoir having a flexible diaphragm which may be placed in contact with the skin of the patient over the artery to be measured. Motion of the diaphragm due to pulsations in the artery acts as a pump to build up pressure in an expansible chamber assembly through a one-way valve arrangement, expansion of the chamber actuating an indicator. A return flow is provided from the fluid chamber to the reservoir through a bleeder valve orifice which is smaller than the feed into the chamber, the bleeder thus acting as a relief valve to permit a steady indication of pressure. The bleeder permits the meter to return toward zero on release of applied pressure, and by modifying the size of this orifice, the release can permit the return swing of the indicator to give an approximate reading of pulse rate. The indicator may be remotely located, with the output of the expansible chamber being converted to corresponding electric signals for transmission to the remote location.

---

The present invention relates in general to blood pressure and pulse rate indicators and, more particularly, to a simple, compact, light-weight, portable device for accurately measuring blood pressure and indicating pulse rate of a human or an animal.

Prior devices for the measurement of blood pressure or pulse rate have been relatively complex devices requiring a skilled operator to obtain the necessary measurements. For example, the usual blood pressure detector requires that a pressure sleeve be wrapped around the arm of the person whose blood pressure is being measured, the pressure sleeve being pumped up by an attendant and slowly released while listening for the pulse sound. Such conventional devices, while useful for specific purposes, are not simple to operate and are neither light-weight nor portable in the sense which the present device is light-weight and portable. The prior devices are not designed to be carried around in an operable position by the user to permit continuous monitoring of pressure and pulse rate, and thus are not useful for this purpose. The conventional method of measuring pulse rate requires that the number of beats per unit time be counted; thus the prior art does not provide a means for obtaining a quick and accurate reading from a device that continuously monitors the patient's heart rate.

The present device overcomes the disadvantages of prior devices by providing a simple, light-weight and portable instrument that can be continuously worn by a patient for use in monitoring and for measuring either pulse rate or blood pressure, or both. In a preferred form, the device is incorporated in a housing similar in size to a wrist watch, permitting the device to be worn on the wrist where it is adapted to sense the pressure and pulse rate in the arteries found there. The subject device is highly portable by reason of its size and mode of operation, giving a convenient and continuous indication that may be easily read by the patient or by an attendant, and which does not require a time-consuming set-up procedure for obtaining pressure readings. When adapted for pulse rate measurements, the device will indicate such readings at a glance.

It is therefor an object of the present invention to provide a simple, light-weight and portable indicator for blood pressure and for pulse rate.

Another object of the present invention is the provision of a portable indicator device which responds to pulsations of a patient's heart to give a continuous reading of blood pressure and which may, with the aid of an assistant, be used to obtain readings of diastolic and systolic pressures.

A further object of the present invention is the provision of a portable indicator which responds to arterial or heart motion to give a pulse rate indication.

An additional object of the present invention is to provide a portable indicator which may be worn by a patient as a wrist watch is worn, the device being easily adaptable to provide high or low pressure measurements or, with less accuracy, both pressure and pulse rate measurements at the same time, the device being secured in place with sufficient tension to permit response to arterial pulsations.

Another object of the present invention is the provision of a light-weight measuring device which can be left on a patient unattended, the device measuring pulse rate and/or blood pressure and being capable of producing an electrical output corresponding to these measurements which can be transmitted to a remote location for continuous monitoring.

Briefly, the present device comprises a hydraulic transducer which transfers the pulsating motion from an artery or vein to an indicating meter. This is accomplished by means of a reservoir of fluid, the reservoir having a flexible diaphragm which is in contact with the skin of the patient over the artery to be measured. The motion of the diaphragm due to pulsations in the artery acts as a pump to build up pressure in an expansible chamber assembly, or hydraulic cylinder, through a one-way valve arrangement. The expansion of the cylinder in response to fluid pressure transferred from the resevoir mechanically drives an indicating meter through a gear mechanism. A return flow line is provided from the fluid chamber of the hydraulic cylinder to the reservoir, the return line being fed through a valve orifice which is smaller than the opening of the feed line into the chamber. The small orifice acts as a relief valve to allow a steady indication of pressure on the meter and to permit the meter to return toward zero on release of the applied pressure. By modifying the size of this orifice, the release of pressure from the hydraulic chamber can be made sufficiently fast to permit the return swing of the meter indicator to give an approximate reading of pulse rate. An alternative to this hydraulic system is the provision of a strain gauge device to respond to the motion of the expansible chamber assembly to produce a varying electrical output that can be transmitted over transmission lines, such as conventional telephone cables to a doctor's office, where the rate and amplitude of the pulses could be monitored.

The foregoing objects and features of the invention as well as various additional advantages and modifications will become more apparent to those skilled in the art from what follows. Although the characteristic features of the invention are set forth with particularity in the appended claims, the invention will be understood more clearly and fully from the following detailed description taken in connection with the accompanying drawings in which:

FIG. 1 is a perspective view of a form of the indicator device adapted to be worn on the wrist;

FIG. 2 is a diagrammatic illustration of the hydraulic and mechanical arrangements by means of which readings are obtained;

FIG. 3 is a modification of the device of FIG. 2; and

FIG. 4 is a diagrammatic illustration of a further modification of the device as it may be applied to a remote indicating device.

Referring now to the illustration of FIG. 1, there is shown a blood pressure indicator constructed in accordance with the present invention, wherein the indicator is adapted to be worn on the wrist in the manner of a wrist watch. The indicator device includes a movable needle 10 pivotally mounted at the center of an indicator face 12 mounted in a watch-like housing 14. The indicator face includes calibrated scales 16 for providing the desired readings while the housing 14 is held in place by an arm band 18. Although the device is here illustrated in the form of a wrist-carried indicator, it will be apparent that the mechanism described herein can be incorporated in any number of ways into various housings for measuring pressure and pulse at any convenient spot on the body. The arm band 18, or equivalent means for holding the indicator in place, preferably is adjustable to permit the device to be held against an artery, the pulsations of which are to be measured, with sufficient firmness to insure an accurate reading. Normally, the arm band will be tightened to the point where the indicator needle 10 will give a predetermined reading so that all measurements will be made from the same pressure starting point.

Referring now to the diagrammatic illustration of FIG. 2, the indicator needle 10 is illustrated as being mounted for rotation on a pivot axis 20. A hair spring arrangement 22 is connected between a fixed point in the housing and needle 10 to urge the needle toward a rest position as determined by the needle stop peg 24. A small gear 26 is fixed to needle 10 for rotation therewith, the gear being driven by a curved rack element 28 which is driven against the stop peg 24 by hair spring 22 when the system is at rest. Rack 28 is carried by a lever arm 30 mounted for rotation about a pivot axis 32 suitably mounted in housing 14. In contact with lever arm 30 some distance from the pivot axis 32 is an expansible chamber assembly, or hydraulic cylinder, 34 having a piston 36 adapted for motion within its housing 38. Hydraulic fluid under pressure is fed to the fluid chamber of the hydraulic cylinder 34 by way of a feed line 40, the fluid pressure in line 40 causing the piston 36 to move out of housing 38 and against the lever arm 30. As is well known in the hydraulic art, the motion of piston 36 will be proportional to the pressure in feed line 40; thus, the rotation of lever arm about its pivot axis 32 will also be proportional to the fluid pressure to cause indicator needle 10 to rotate about its pivot axis 20 by a similarly proportional amount. A feedback or bleeder tube 42 is connected to the fluid chamber in hydraulic cylinder 34 through a very small orifice valve 44. The orifice 44 is sufficiently small as not to appreciably affect the build up of pressure in the fluid chamber of cylinder 34, while being sufficiently large to permit fluid in the chamber to be released shortly after reduction of the pressure being applied to the system.

Supplying the hydraulic pressure to feed line 40 is a fluid reservoir 46 having a flexible diaphragm 48 attached in sealing relationship to a casing 50. Casing 50 is, in the preferred embodiment, a portion of indicator housing 14. The positioning of the reservoir and flexible diaphragm is such that the diaphragm will be placed over an artery or vein 52 when the indicator device is being worn by a patient. Expansion and contraction of artery 52 forces fluid from reservoir 46 through one-way valve opening 54 into the valve housing 56 and thence through a second valve opening 58 into the valve chamber 60. Valve openings 54 and 56 are of sufficient size to permit free flow of the hydraulic fluid from the reservoir through valve chamber 60 to the feed line 40 which is connected by suitable means to the valve chamber. In order to insure a one-way flow of hydraulic fluid through the feed line 40, whereby pressure may build up in the hydraulic cylinder assembly 34, a spring-loaded valve clapper 62 is arranged to cover valve opening 54. The clapper is held in place by a coil spring 64 so that opening 54 is normally covered. The resilience of spring 64 is so adjusted that even slight pressure from artery 52 will permit fluid to flow from reservoir 46 through opening 54 to chamber 60 while insuring that clapper 62 will close upon release of such pressure. Bleeder tube 42 is connected to reservoir 46 to return hydraulic fluid from assembly 34 to the reservoir, permitting a complete circulation of hydraulic fluid during operation of the device and permitting the hydraulic system to return to a balanced condition upon removal of pressure from diaphragm 48.

FIG. 3 illustrates a modification of the gearing mechanism which transfers the motion of lever arm 30 to indicator needle 10. Thus, a gear train comprised of idler gear 66, transfer gear 68 and secondary gear 70 is interposed between rack 28 and gear wheel 26 to provide multiplication of the motion of needle arm 10 with respect to the motion of lever arm 30, as is well known in the gear train art. This amplification permits a larger scale to be used on the indicator face to make the reading of pressure values easier. Thus, indicator face 12 is shown as including two calibrated scales at 16, the one scale being used with one gear arrangement and the other scale being used with the multiplier gear arrangement.

In operation, the indicator device is fixed by means of arm band 18 in such a position that the flexible diaphragm 48 is in contact with an artery or vein so as to detect the pulsations thereof. The arm band is tightened to the point where the diaphragm is able to sense motion in the artery 52. Normally, this will involve a tightening of the band until indicator needle 10 indicates a predetermined point on the scale 16, thus insuring that the diaphragm will be pressed against the artery with the same amount of force during each usage of the device. Tightening of the arm band forces a certain amount of fluid out of reservoir 46, through valve chamber 60 and feed line 40 into the hydraulic assembly 34 to cause the indicator needle to rotate to the desired point. Pulsations in artery 52 cause further changes in the volume of the reservoir 46, forcing additional hydraulic fluid through valve opening 54, through chamber 60 and feed line 40 into the fluid chamber of ram assembly 34, causing the fluid chamber to expand and forcing piston 36 out of housing 38. As long as the pressure in reservoir 46 due to the expansion of artery 52 is greater than the pressure in chamber 60, fluid will continue to flow through opening 54 to increase the pressure in assembly 34. Since the bleeder tube 42 has a very small orifice at 44, there will be a relatively insignificant flow of hydraulic fluid from the fluid chamber of cylinder 34 back to reservoir 46. When the pressure on each side of valve opening 54 is equalized, further pulsations of artery 52 will not force open valve clapper 62 and the pressure in assembly 34 will stabilize. Of course, there will be a small amount of flow back to reservoir 46, but this will be sufficiently slow to permit the pulsations of the arteries to supply additional fluid through valve opening 54 to maintain the pressure in the fluid chamber of cylinder 34 at a substantially constant value.

The expansion of the fluid chamber in cylinder 34 due to increased pressure causes piston 36 to move out of housing 38, as has been noted. This motion of piston 36 causes lever arm 30 to rotate counterclockwise about its pivot axis 32, which, in turn, causes gear 26 to rotate in a clockwise direction. As the pressure in 34 builds up, indicator needle 10 will thus be rotated in a clockwise direction against the counterclockwise bias of spring 22. When the hydraulic pressure has reached the maximum value provided by the pulsations in artery 52, the indicator needle will be at a location proportional to and indicative of that pressure. By proper adjustment of the tension of hair spring 22 and by proper calibration of the scale, a direct reading of the blood pressure in artery 52 may then be obtained. By reason of the one-way valve arrangement and the small orifice in the bleeder tube, there will be no appreciable fluctuation in the needle indication.

It will be apparent that the present device can be used to measure systolic and diastolic blood-pressures in the manner of well known sphygmomanometers. For this use, of course, a stethoscope or the like will be required to detect the absence and the presence of a pulse as the pressure applied on the artery by diaphragm 48 is increased and decreased. However, the present device is not specifically designed for that type of use, but rather is designed to provide a continuous monitoring of the blood-pressure at a value between the systolic and diastolic values.

Thus, the primary use of the present device will be in providing a continuous monitoring of a patient where it is particularly desirable to watch closely for and to measure changes in blood pressure. Although the device as above described is designed to provide a substantially stable indication of blood pressure, it may in some circumstances be desirable to permit a fluctuation of needle 10 to provide an indication of pulse rate. This may be accomplished by making orifice valve 44 larger so as to permit a faster drain of the fluid chamber in hydraulic assembly 34. This will permit the pressure to fall off between each pulse in artery 52 and will result in corresponding movement of indicator needle 10 by spring 22. Since the needle will fall back toward its rest position at a substantially constant rate, the distance that it falls back between succeeding pulses will be a rough measure of the pulse rate. Thus, the faster the pulse rate, the shorter the distance the needle will fall back toward its rest position between pulses. Similarly, the slower the pulse rate the longer will be the periods between succeeding pulses and the further the needle will fall toward rest position. By careful calibration of the indicator scale and by careful adjustment of the size of orifice valve 44, it will be possible to obtain a rough direct reading of pulse rate by watching the point on the calibrated scale to which needle 10 falls back during the pauses between pulses. This reading, of course, will only be an indication of pulse rate, and will be dependent on blood pressure for accuracy, but will be adequate to permit quick checks on a patient's condition. Further, this type of indication is highly useful in detecting changes in condition.

Referring now to FIG. 4, there is illustrated a modification of, or accessory to, the present invention which permits transmission of blood pressure and pulse rate readings to a remote location. The illustrated system provides for the transmission of these signals over conventional telephone lines; however, it will be apparent that the system can be adapted to other types of transmission systems. In order to permit the transmission of pressure and pulse readings, it is necessary to convert the measured values into electric signals. This may be accomplished through the use of a stress-sensing device of known type, such as a carbon pile resistor, which changes its value of resistance with changing pressure. Such a stress sensor, indicated at 72 in FIG. 4, may be adapted to respond to the hydraulic assembly 34 to sense the pulsations. Other arrangements will be apparent to those skilled in the art. As illustrated in FIG. 4, the carbon resistor sensor 72 is connected in series with a small voltage battery cell 74, the series arrangement being connected across a suitable meter 76. Meter 76 serves to indicate the variations in resistance of sensor 72 to provide an indication of the changes in resistance of sensor 72. These changes in resistance, as noted above, will be proportional to the pressure built up in the hydraulic system and thus will provide an indication of blood pressure. If the hydraulic system is arranged to provide a varying pressure, the meter will, of course, reflect these variations and thus will provide an indication of pulse rate. Also connected across the series arrangement of the sensor 72 and cell 74 is an amplifier and encoder 78 which amplifies the signals representing the resistance of sensor 72 and changes them to a form which is suitable for transmission to a remote location. The output of amplifier and encoder 78 may be applied to a conventional telephone line 80 by any suitable known means, for example, by dialing a code number on a conventional telephone. The signals thus applied to the transmission line are transferred to a central telephone exchange 82. The telephone exchange may respond to the encoded signals themselves or to the code number dialed first by the user of the system to connect the signals to a telephone company computer 84. The computer deciphers the coded number and completes the call through a doctor's office or hospital switchboard 86 for automatic connection to a decoder and chart recorder 88. The chart recorder will then respond to the input signals to produce a trace corresponding to the variations in resistance of sensor 72. The chart record may then be read by a doctor or technician to determine the pulse and blood pressure of the patient. It will be apparent, of course, that the telephone line may be omitted from this system and that the amplifier and decoder may be connected through a suitable transmission line directly to a corresponding decoder and chart recorder at a central point. Such an arrangement will permit a single technician to monitor a plurality of patients at one time from one location.

Thus there has been described a simple, lightweight and portable apparatus for measuring and monitoring blood pressure or pulse rate of a patient. It will be apparent to those skilled in the art that many variations and modifications of the basic concept can be devised; therefore, it is desired that the foregoing illustration be taken as illustrative and that the scope and extent of the invention be limited only by the following claims.

We claim:

1. A compact, portable transducer for continuous monitoring of the blood pressure of a patient, comprising hydraulic means including a fluid reservoir having a flexible wall, an expansible chamber assembly, and transfer means for carrying fluid from said reservoir to said expansible chamber assembly upon compression of said reservoir, said transfer means including means for retarding the return of said fluid to said reservoir; indicator means responsive to the expansion of said assembly; and means for positioning said flexible wall for response to circulatory system pulsations in said patient, said pulsations exerting pressure on said flexible wall to cause fluid in said reservoir to flow into and to expand said expansible chamber assembly in proportion to the pressure on said flexible wall, whereby said indicator means provides a continuous indication of the fluid pressure in said expansible chamber assembly and thus of the blood pressure of said patient.

2. The mechanism of claim 1, wherein said indicator means comprises a meter having a calibrated scale and a needle connected to said expansible chamber assembly, whereby direct readings of blood pressure can be obtained.

3. The mechanism of claim 2, further including a housing for said hydraulic means and said indicator means, said flexible wall of said reservoir forming a portion of said housing.

4. The mechanism of claim 1, wherein said transfer means for carrying said fluid to said reservoir includes one-way valve means interposed between said reservoir and said expansible chamber assembly to permit fluid flow to said expansible chamber assembly upon compression of said reservoir.

5. The mechanism of claim 4, wherein said means for retarding the return of said fluid includes bleeder means for returning fluid from said expansible chamber assembly to said reservoir, whereby fluid pressure built up in said expansible chamber assembly is released gradually upon release of pressure on said flexible wall.

6. The mechanism of claim 5, wherein said indicator means includes a meter having a calibrated scale; means for connecting said meter to said expansible chamber assembly whereby the pressure of fluid in said expansible chamber assembly is converted to a corresponding indication on said meter to provide a direct reading of blood pressure.

7. The mechanism of claim 6, wherein said means for connecting said meter to said expansible chamber assembly includes a gear train and a lever arm responsive to motion of said expansible chamber assembly to drive said gear train, said gear train being connected to said meter.

8. The mechanism of claim 6, wherein said indicator means further includes sensor means responsive to the expansion of said expansible chamber assembly for converting the fluid pressure in said expansible chamber assembly to a corresponding electrical signal, and means for transmitting said signal to said meter for monitoring of the circulatory system of said patient.

9. The mechanism of claim 8, wherein said meter is remote from said expansible chamber assembly, whereby said monitoring can be accomplished at a location remote from said patient.

10. The mechanism of claim 5, wherein said bleeder means includes an orifice value sufficiently small to permit the fluid presser in said expansible chamber assembly to build up to a value proportional to the pressure exerted by said circulatory system pulsations and to remain at a substantially constant value between said pulsation whereby said indicator means provides a constant reading of blood pressure.

11. The mechanism of claim 5, wherein said bleeder means includes an orifice valve sufficiently small to permit the fluid pressure in said expansible chamber assembly to build up to a value proportional to the pressure exerted by said circulatory system pulsations, and large enough to permit a portion of said fluid pressure to bleed off between said pulsations, whereby said indicator means fluctuates to provide readings of both blood pressure and the rate of said pulsations.

12. The mechanism of claim 5, wherein said bleeder means comprises an orifice valve having an opening substantially smaller than the opening of said one-way valve means.

13. The mechanism of claim 12, wherein said expansible chamber assembly includes a fluid chamber and a movable piston, said fluid chamber receiving fluid under pressure from said reservoir and said piston moving in response to the pressure of said fluid.

14. The mechanism of claim 13, wherein said indicator means includes a meter having an indicator needle; means for connecting said needle to said piston whereby the pressure of fluid in said fluid chamber is converted to a mechanical motion of said needle, and spring means urging said needle in a direction to oppose movement of said piston when said fluid pressure increases.

15. The mechanism of claim 14, wherein said means for positioning said flexible wall for response to circulatory system pulsations comprises a housing for said hydraulic means and said indicator means, said flexible wall of said reservoir forming a portion of one wall of said housing, said meter being mounted on another wall of said housing, and means for holding said flexible wall in contact with the skin of the patient.

References Cited

UNITED STATES PATENTS

| | | | |
|---|---|---|---|
| 2,753,863 | 7/1956 | Bailey | 128—2.05 |
| 2,854,968 | 10/1958 | Wright | 128—2.05 |
| 3,090,377 | 5/1963 | Salisbury et al. | 128—2.05 |
| 3,199,508 | 8/1965 | Roth | 128—2.06 |

OTHER REFERENCES

Buchmann, German application No. 1,006,581, Apr. 18, 1957.

WILLIAM E. KAMM, Primary Examiner